United States Patent
Breen

Patent Number: 5,523,947
Date of Patent: Jun. 4, 1996

[54] SYSTEM AND METHOD FOR ESTIMATING TRAILER LENGTH

[75] Inventor: Michael T. Breen, Garden City, Mich.

[73] Assignee: Eaton Corporation, Cleveland, Ohio

[21] Appl. No.: 126,531

[22] Filed: Sep. 24, 1993

[51] Int. Cl.⁶ ................................................. B62D 53/06
[52] U.S. Cl. .............. 364/424.05; 280/400; 280/423.1; 280/426
[58] Field of Search ............... 364/424.05, 426.01, 364/426.02, 562; 280/400, 423.1, 426, 432

[56] References Cited

U.S. PATENT DOCUMENTS

| | | | |
|---|---|---|---|
| 4,645,315 | 2/1987 | Morgavo | 33/264 |
| 4,970,496 | 11/1990 | Kirkpatrick | 364/557 |
| 5,029,948 | 7/1991 | Breen et al. | 280/432 |
| 5,033,798 | 7/1991 | Breen | 280/432 |
| 5,102,202 | 4/1992 | Breen | 280/432 |
| 5,108,158 | 4/1992 | Breen | 280/243 |
| 5,196,965 | 3/1993 | Lang et al. | 359/841 |
| 5,269,389 | 12/1993 | Tomiyoshi et al. | 280/432 |
| 5,282,641 | 2/1994 | McLaughlin | 280/426 |
| 5,329,451 | 7/1994 | Notsu | 364/424.05 |
| 5,380,072 | 1/1995 | Breen | 364/426.02 |

*Primary Examiner*—Gary Chin
*Attorney, Agent, or Firm*—Brooks & Kushman

[57] ABSTRACT

A method and system for estimating the segment length of a multi-segment vehicle such as a semi tractor trailer vehicle is disclosed. The estimate is generated when the vehicle executes a turning maneuver. The method comprises determining the turning radius of the vehicle, sensing the articulation angle between two vehicle segments, such as a tractor and a trailer, generating a length estimate, and controlling the vehicle based on the estimate. The method and system are particularly useful for vehicles with steerable trailer axles in which controlling the vehicle includes automatically steering the trailer so that the trailer wheels follow a path substantially the same as the tractor wheels thus eliminating off-tracking. Controlling the vehicle may include detecting a jackknife condition and operating the braking system.

19 Claims, 2 Drawing Sheets

SYSTEM AND METHOD FOR ESTIMATING TRAILER LENGTH

TECHNICAL FIELD

The present invention relates to an apparatus and method for estimating the length of a trailer.

BACKGROUND ART

In an effort to maximize the efficiency of commercial vehicles used to transport goods, such vehicles have been made increasingly larger in size and carrying capacity. For some applications, it is desirable to pull a tandem trailer, which is usually as long as two trailers, with a single vehicle to further increase the carrying capacity of the vehicle. However, the advantage of having a single operator deliver a large quantity of goods, whether measured in number or by weight, is accompanied by more difficult vehicle maneuverability which in turn requires an operator of greater skill and experience.

Tasks which are relatively simple to perform by the operator of a passenger vehicle, such as turning a corner or backing the vehicle, become significantly more cumbersome and require greater skill and attention when pulling a trailer, especially a fully loaded semi-trailer. Since the trailer wheels do not follow the same path as the wheels of the tractor (a condition known as off-tracking), the operator must alter the path of the tractor to compensate accordingly.

The amount of compensation required for the trailer wheels to follow an acceptable path which is clear of obstructions such as curbs and utility poles, is largely dependent upon the length of the trailer. The longer the trailer, the more compensation required. The wheel path compensation required makes the vehicle considerably more difficult to maneuver, especially around sharp corners.

Maneuverability can be greatly improved by providing a steerable trailer axle. One, somewhat dated, but prominent display of this solution is illustrated by the traditional hook and ladder type fire engine. Such vehicles employ one vehicle operator to steer the towing vehicle and another operator located at the rear of the trailer to steer the trailer axle. Thus, successful navigation of the vehicle requires two skilled operators acting in concert.

More recently, systems have been developed which incorporate a steerable trailer axle which is automatically controlled by an on-board electronic control unit. These systems substantially eliminate the off-tracking of the trailer wheels characteristic of conventional tractor-trailer vehicles without the need for compensation by a skilled operator. However, for proper operation, such systems require an accurate estimate of the length of the trailer being towed.

For proper trailer wheel tracking in a typical tractor semi-trailer application, the estimate of the trailer length should accurately gauge the distance between the center of the tandem axle on the tractor and the center of the tandem axle on the trailer. The overall trailer length estimate can be less accurate than this more critical dimension unless the overall length is required for use by a controller or routine which assists the operator in backing the vehicle. Thus, it is desirable to have a system capable of accurately estimating the length of the trailer and, more precisely, the distance from the rear axle of the towing vehicle to the trailer axle.

Trailer length is also used by vehicles equipped with electronically controlled braking systems. The length of the trailer is an important parameter used by tractor-based trailer stability control systems to differentiate between a jackknife condition in which the trailer is pushing the tractor, and the more common, controlled turning condition., so that the appropriate action, if any, may be taken. If an impending jackknife condition is detected, appropriate action may include operating the braking system of the tractor, the trailer, or both.

The prior art discloses a number of devices which assist the operator of a vehicle towing a trailer in performing tasks such as backing the vehicle and safely passing other vehicles. These devices, such as those disclosed in U.S. Pat. No. 4,645,315 to Morgavo; U.S. Pat. No. 4,970,496 to Kirkpatrick; and U.S. Pat. No. 5,196,965 to Lang use apparatus mounted toward the rear of the trailer to sense the distance, or assist the operator in sensing the distance, between the trailer and some other object. However, none discloses a system or method for actually determining the length of the trailer to be used in similar type applications or for use in a vehicle towing a trailer with a steerable axle to eliminate off-tracking.

SUMMARY OF THE INVENTION

It is, therefore, an object of the present invention to provide a system and method for estimating at least one segment length of a multi-segment vehicle, such as the length of a trailer in a tractor semi-trailer vehicle.

In carrying out the above object and other objects and features of the present invention, a system for estimating the length of one of the segments of a multi-segment vehicle while the vehicle is engaged in a turning maneuver is provided. Preferably, the vehicle includes an electronic control unit with memory for generating and storing the length estimate. The system includes means for determining the turning radius of the vehicle and means for sensing the articulation angle formed by the intersection of longitudinal axes of two adjacent vehicle segments. The system also includes means for controlling the operation of at least one of the vehicle segments based on the estimated length. The means for controlling may include a steerable axle disposed beneath the controlled segment and an electronically controlled braking system.

In further carrying out the above object and other objects and features of the present invention, a method is provided for estimating the length of a trailer being towed by a vehicle during a turning maneuver for use in controlling the vehicle or for use by the controller of the vehicle. The method includes determining the turning radius of the vehicle and sensing the relative angle between the longitudinal axes of the towing vehicle and the trailer. The method also includes generating an estimate of the trailer length, and controlling the operation of the vehicle based on the estimated length of the trailer.

The advantages accruing to the present invention are numerous. For example, the system and method of the present invention provide an accurate estimate of the distance between the rear axle of the towing vehicle and the rear trailer axle utilizing sensors and other components typically found on a vehicle equipped with an electronic control unit. This information can then be used by the electronic control unit to provide increased maneuverability in vehicles equipped with steerable trailer axles, and to provide increased trailer stability when an impending jackknife condition is detected, in vehicles equipped with electronically controlled braking systems.

The above objects and other objects, features, and advantages of the present invention will be readily appreciated by

BEST MODE FOR CARRYING OUT THE INVENTION

Figure 1:
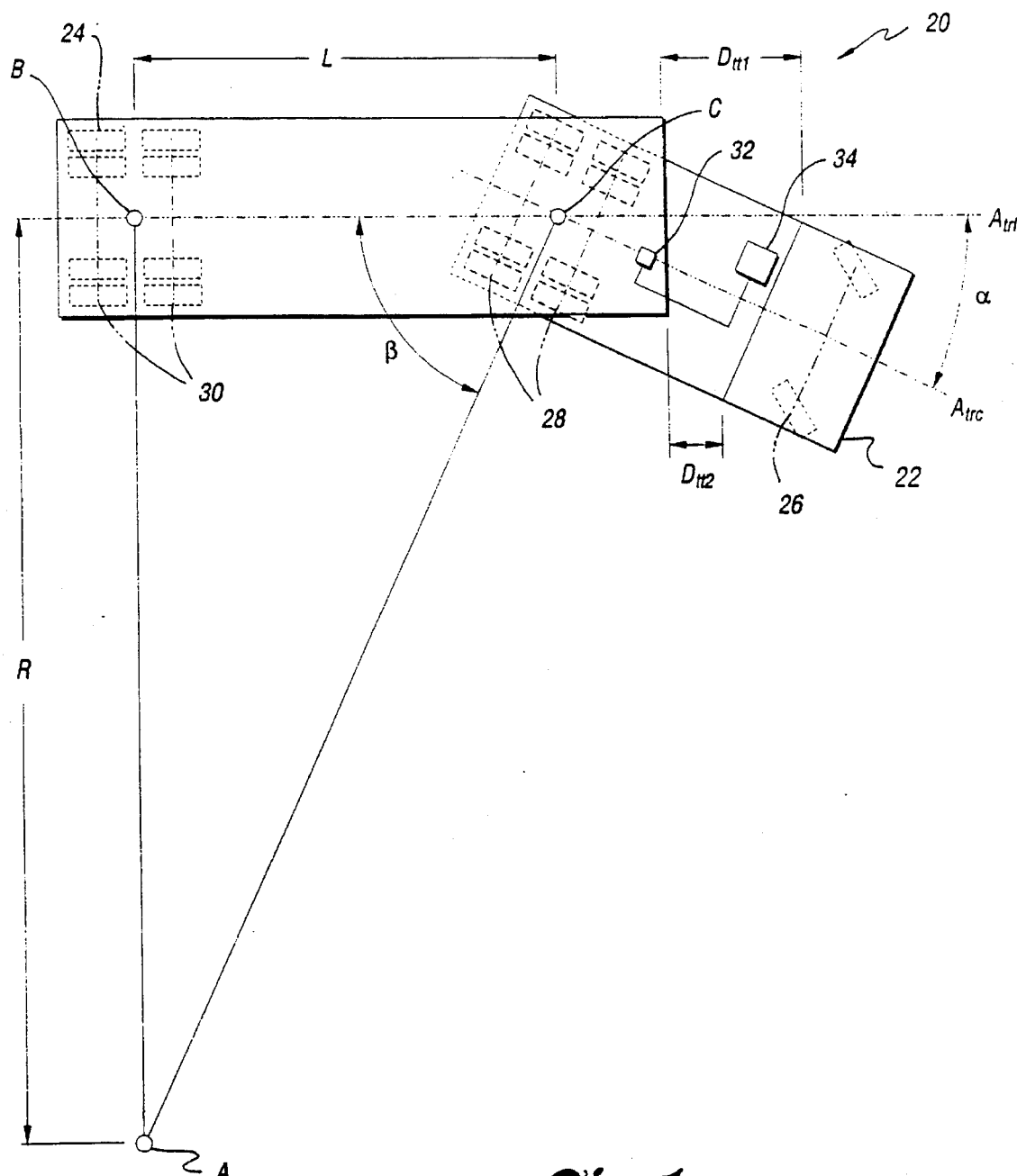
FIG. 1 is a diagrammatic representation of a preferred embodiment of the system for estimating trailer length according to the present invention.
Figure 2:
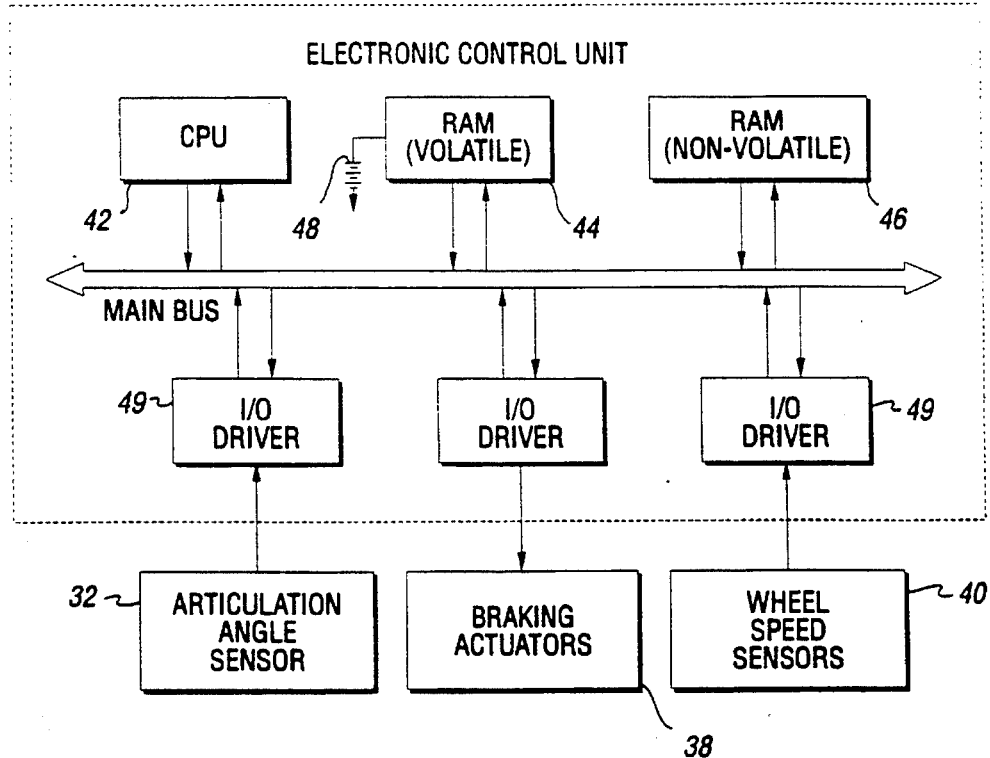
FIG. 2 is a block diagram showing the components of the electronic control unit of the system for estimating trailer length according to the present invention.

Referring now to FIG. 1, there is shown a diagrammatical representation of a system for estimating trailer length. The illustration depicts a vehicle, such as a tractor semi-trailer, indicated generally by reference numeral 20, engaged in a controlled turning condition. The vehicle includes a tractor 22 pivotally connected to a trailer 24 by a standard fifth wheel and trailer kingpin arrangement at point C, as is well known in the art and not shown in greater detail for the sake of clarity. The tractor 22 includes a steer axle 26 and tandem drive axles 28. An articulation angle sensor 32 is preferably positioned along the longitudinal axis, $A_{trc}$, of the tractor 22 near the fifth wheel for sensing the articulation angle α between the tractor and the semi-trailer and is in communication with an electronic control unit 34, a block diagram of which is shown in FIG. 2 Any of a number of sensors would be appropriate to detect this angle such as an encoder or a resolver, as is well known in the art.

Perhaps less obvious, but equally functional for determining α, is the use of two distance sensors, not specifically illustrated, located near the outer edges of the trailer 24, substantially equidistant from the longitudinal axis ($A_{trl}$), to sense the differential distance between the cab of the tractor and the trailer on one side ($D_{tt1}$), and the similar distance on the opposite side ($D_{tt2}$). These distances are nearly equal when the vehicle 20 is traversing a straight path but become unequal when executing a turn. The greater the difference between these distances, the smaller the turning radius R.

As also illustrated in FIG. 1, the fifth wheel and trailer kingpin arrangement is positioned approximately in the center of the tandem drive axles 28 at point C. The longitudinal axes of the tractor 22 and the trailer 24 are shown for reference ($A_{trc}$ and $A_{trl}$, respectively). The interior angle, β, of the right triangle with vertices indicated by reference points A, B, and C, is the complement of the articulation angle α and is also shown for reference.

The trailer 24 in the system of FIG. 1, includes the trailer kingpin at point C for pivotally connecting the trailer 24 to the fifth wheel of the tractor 22. The trailer also includes tandem trailing axles 30. In one embodiment, the tandem trailing axles 30 are pivotally attached to the trailer 24 near point B so that the trailer 24, and more precisely the tandem trailing axles 30, can be automatically controlled by the electronic control unit 34, independent of the tractor 22.

As is further shown in FIG. 1, reference point B is located near the midpoint of the tandem trailing axles 30 on the longitudinal trailer axis $A_{trl}$. Reference point A is located at the center of the turning radius R, which is defined by the path of the wheels of the tandem drive axles 28. The turning radius of the vehicle represented by R is determined as described in greater detailed below. The estimated trailer length, L, is the distance between the center of the tandem drive axles 28 and the center of the tandem trailing axles 30. Of course the tractor 22, the trailer 24, or both may be equipped with single or multiple axles in which case L would still represent the distance between reference points B and C, however, point B would be located over the most rearward single axle or over the center of the most rearward tandem axles.

Preferably, the vehicle 20 of FIG. 1 also includes an electronically controlled braking system. The braking system comprises standard components such as brake pads, wheel cylinders, and valves at each of the braking sites at the vehicle wheels as is well known in the art and not specifically shown for the sake of clarity. The braking system also includes sensors and actuators which are in communication with, and controlled by an electronic control unit 34 as shown in greater detail in the block diagram of FIG. 2.

Referring now to FIG. 2, there is illustrated a block diagram of an electronic control unit (ECU) 34 in communication with the articulation angle sensor 32, brake actuators 38, and wheel speed sensors 40 (not specifically shown in FIG. 1 for the sake of clarity). As shown, the ECU 34 includes a central processing unit 42, preferably a microprocessor, having volatile random-access memory (RAM) 44, nonvolatile memory such as read-only memory (ROM) 46, and a battery 48 to maintain at least a portion of the contents of RAM 44 when the main power supply is off or disconnected. Of course, the ECU 34 may contain other types of memory instead of, or in addition to, RAM 44 and ROM 46, such as EPROM or EEPROM memories, as is well known in the art.

The non-volatile memory 46 illustrated in FIG. 2, may contain instructions, which are executed to perform various control and information functions, as well as data tables, which contain calibration values and parameters which characterize normal vehicle operation. Central processing unit (CPU) 42 executes instructions contained in the non-volatile memory and performs calculations as well as storing information in, and retrieving information from, the various volatile and non-volatile memories. In addition, the CPU 42 imparts control signals to, and receives signals from, standard input and output (I/O) drivers 49. The standard I/O drivers 49 are operably connected to the articulation angle sensor 32 the braking actuators 38, and the wheel speed sensors 40. The I/O drivers 49 are essentially signal conditioning circuits which serve to protect the ECU 34 from hostile electrical impulses, while providing the signals and power necessary for vehicle control according to the present invention.

With continuing reference to FIG. 2, the ECU 34, of course, receives signals from various other sensors and controls a number of actuators which are not shown, such as temperature and pressure sensors, electric motors, and lights. The ECU componentry detailed above is interconnected by data, address and control buses. It should be noted that there are a variety of other possible control schemes which include various combinations of microprocessors and electric or electronic circuits which could perform the same function.

Figure 3:
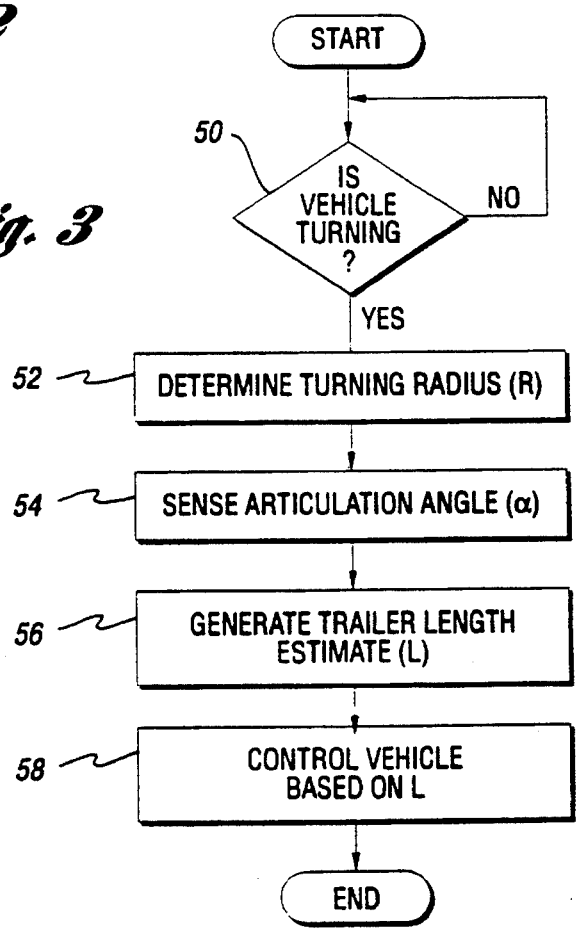
FIG. 3 is a flow chart illustrating the method for estimating trailer length according to the present invention.

Referring now to FIG. 3, a flowchart is shown which illustrates the method for estimating trailer length according to the present invention. Of course the method described below, as well as the system disclosed above, is not limited to vehicles pulling trailers or to trailers in general. This method and apparatus could easily be applied to any vehicle in which a first vehicle segment is pivotally attached to a second vehicle segment so that the longitudinal axes of the segments intersect forming an angle of articulation when the vehicle is in a turning condition. For example, multi-segment vehicles are often used in large metropolitan areas as an integral component of a mass transit system. Such vehicles are constantly subjected to navigation around tight corners in congested areas and would be more maneuverable if they had steerable segments and an accurate estimate of the length of the segment being controlled.

As shown in FIG. 3, the first step 50 of the method involves determining whether the vehicle is in a turning condition. This step can be accomplished in a number of ways which may include any one or a combination of: sensing a change in the magnitude or the direction of the steering wheels on the towing vehicle, sensing the articulation angle formed between the towing vehicle and the trailer, and sensing a differential speed between wheels located on opposite sides of the longitudinal axis of either the towing vehicle or the trailer.

Still referring to FIG. 3, once a turning condition is indicated at step 50, it is necessary to determine the turning radius of the vehicle, R, at step 52. The turning radius is determined by a method which includes sensing the differential wheel speed between trailer wheels located on opposite sides of the longitudinal trailer axis. This method is disclosed and explained in greater detail in U.S. Pat. No. 5,108,158, titled "Trailer Brake Control, the specification of which is hereby incorporated by reference in its entirety. According to the teaching of that invention, the equilibrium turning radius of curvature for a single axle vehicle in circular motion is $$TRC_E = \frac{1}{R} = \frac{1}{TW}\left(\frac{W_1}{W_2} - 1\right)$$

where:
R=turn radius,
$W_1$=speed of the outside wheel,
$W_2$=speed of the inside wheel, and
TW=track width which is the center to center spacing of the two wheels.

The above equation can be approximated as a dynamic equation by means of a series expansion: where:
$\dot{W}_1$=first time derivative of W1,
$\dot{W}_2$=first time derivative of W2, and
$\Delta t$=change in time.

$$DTRC = TRC_E + \Delta t \left(\frac{dTRC}{dW_1}\frac{dW_1}{dt} + \frac{dTRC}{dW_2}\frac{dW_2}{dt}\right) + \text{HIGHER ORDER TERM}$$

$$= \frac{1}{TW}\left\{\left(\frac{W_1}{W_2} - 1\right) + \Delta t\left(\frac{1}{W_2}\dot{W}_1 - \frac{W_1}{W_2^2}\dot{W}_2\right)\right\} + \text{HIGHER ORDER TERM}$$

The higher order terms may be dropped as being less significant to the approximation of the dynamic value. Assuming the vehicle is in motion, the dynamic turning radius of curvature of the steer axle of a vehicle may be approximated as a function of the expression:

$$K\left\{\frac{W_1}{W_2} - 1 + \Delta t \left(\frac{\dot{W}_1 W_1 \dot{W}_2}{\dot{W}_2 (\dot{W}_2)^2}\right)\right\}$$

where:
K=a constant depending upon vehicle geometry,
$W_1$=speed of the outside wheel,
$W_2$=speed of the inside wheel,
$\dot{W}_1$=first time derivative of $W_1$,
$\dot{W}_2$=first time derivative of $W_2$, and
$\Delta t$=change in time.

The articulation angle is sensed at step 54 of FIG. 3. As illustrated in FIG. 1, the articulation angle, $\alpha$, is the acute angle formed by the intersection of the longitudinal axis of a trailer and the longitudinal axis of an associated towing vehicle. Of course the order of the above described steps is of no particular significance and the same result described below could easily be obtained by performing the steps in any sequence.

Returning now to FIG. 3, the estimate of the trailer length L is generated at step 56 utilizing the turning radius R determined at step 52 according to the equation:

$$L = R * \tan(\alpha)$$

This relationship is obtained from the right triangle in which the adjacent leg represents the trailer length L, the opposite leg represents the turning radius R, and the angle opposite R, labelled $\beta$, is the complement of the angle of articulation $\alpha$ such that:

$$\beta = \frac{\pi}{2} - \alpha$$

so that:

$$L = \frac{R}{\tan(\beta)} = \frac{R}{\cot(\alpha)} = R * \tan(\alpha)$$

Thus, in the preferred embodiment, the estimate of the trailer length approximates the distance between the center of the tandem axle of the towing vehicle and the center of the tandem axle of the trailer.

As also shown in FIG. 3, the vehicle is controlled at step 58 based upon the estimate of the trailer length determined in step 56. In systems utilizing trailers with steerable axles, step 56 includes controlling the trailer axle to minimize off-tracking which occurs when the trailer wheels do not follow a path substantially similar to the wheels of the towing vehicle. Information from the articulation angle sensor taken in conjunction with wheel speed information can be used to approximate the path followed by the wheels of the towing vehicle. Since the trailer length has also been determined, it is possible to control the trailer wheels or axle so the trailer follows a substantially similar path to that of the tractor without compensation by the tractor operator.

In vehicles equipped with electronically controlled trailer stability systems, the trailer length is used by the electronic control unit 34 to distinguish between a jackknife condition and a normal controlled turning condition. If a jackknife condition is detected, the vehicle braking system may be operated to assist in bringing the trailer under control.

It is understood, of course, that while the form of the invention herein shown and described constitutes the preferred embodiment of the invention, it is not intended to illustrate all possible forms thereof. It will also be understood that the words used are descriptive rather than limiting, and that various changes may be made without departing from the spirit and scope of the invention as claimed below.

What is claimed is:

1. A system, for use with a vehicle having a plurality of pivotally connected segments each having at least two wheels, for estimating the length of at least one of the plurality of pivotally connected segments of the vehicle while the vehicle is engaged in a turning maneuver, the system comprising:

means for determining a turning radius of the vehicle;

means for sensing an articulation angle defined by an intersection of a longitudinal axis of a first vehicle segment of the plurality of pivotally connected segments and a longitudinal axis of a second vehicle segment of the plurality of pivotally connected segments;

means for generating a length estimate of the second vehicle segment based on the turning radius and the articulation angle; and means for controlling operation of at least one of the plurality of pivotally connected vehicle segments based on the estimated length of the second vehicle segment.

2. The system of claim 1 wherein the means for sensing comprises a rotary position sensor for determining relative rotational movement between the first and second vehicle segments.

3. The system of claim 2 wherein the means for determining comprises:

at least two wheel speed sensors positioned on opposite sides of the second vehicle segment; and means for determining the difference in the speeds of at least two wheels associated with the sensors.

4. The system of claim 3 wherein the means for controlling comprises a steerable axle disposed beneath the at least one of the plurality of vehicle segments for modifying a direction of travel of the at least one of the plurality of pivotally connected segments independent of an adjacent segment.

5. The system of claim 4 wherein the means for controlling further comprises an electronically controlled braking system for controlling brakes of the vehicle.

6. The system of claim 5 wherein the means for generating estimates the length of the second vehicle segment according to:

$$L = R * \tan(\alpha)$$

wherein L is the second vehicle segment length, R is the turning radius, and $\alpha$ is the articulation angle.

7. The system of claim 2 wherein the means for determining comprises means for sensing the magnitude and direction of a change in the orientation of a plurality of the vehicle wheels.

8. The system of claim 1 wherein the means for sensing comprises a plurality of distance sensors positioned substantially equidistant from the longitudinal axis of the first or second vehicle segment for determining a difference in distance between two adjacent the first and second vehicle segments on opposing sides of the longitudinal axis of the first or second vehicle segment.

9. The system of claim 8 wherein the means for determining comprises:

at least two wheel speed sensors positioned on opposite sides of the second vehicle segment; and means for determining the difference in the speeds of the at least two wheels associated with the sensors.

10. A system for use with a vehicle having a tractor pivotally connected to a trailer for estimating the length of the trailer while the vehicle is engaged in a turning maneuver, the system comprising:

means for determining a turning radius of the vehicle;

means for sensing an articulation angle defined by an intersection of a longitudinal axis of the tractor and a longitudinal axis of the trailer;

means for generating an estimate of the length of the trailer based on the turning radius and the articulation angle; and means for controlling the operation of at least one of the tractor and the trailer based on the estimated length of the trailer.

11. The system of claim 10 wherein the tractor includes a tandem tractor axle and the trailer includes a tandem trailer axle and wherein the means for generating estimates the trailer length according to:

$$L = R * \tan(\alpha)$$

wherein L is the distance from the center of the tandem trailer axle to the center of the tandem tractor axle, R is the turning radius, and $\alpha$ is the articulation angle.

12. The system of claim 11 wherein the means for controlling comprises:

a steerable axle disposed beneath the trailer for modifying a direction of travel of the trailer independent of the tractor; and an electronically controlled braking system for controlling the brakes of the vehicle.

13. A method, for use with a vehicle having a plurality of pivotally connected segments and an electronic control unit with memory for controlling the vehicle, for estimating the length of one of the plurality of pivotally connected segments of the vehicle while the vehicle is engaged in a turning maneuver, the method comprising:

determining a turning radius of the vehicle;

sensing an articulation angle defined by an intersection of a longitudinal axis of a first one of the plurality of pivotally connected segments and a longitudinal axis of a second one of the plurality of pivotally connected segments;

generating an estimate of the length of the second vehicle segment based on the turning radius and the articulation angle; and controlling operation of at least one of the plurality of pivotally connected segments based on the estimated length of the second vehicle segment.

14. The method of claim 13 wherein the step of sensing an articulation angle comprises sensing the geometrical complement of the articulation angle.

15. The method of claim 13 wherein the step of sensing an articulation angle comprises sensing a differential distance between adjacent vehicle segments along opposite sides of a longitudinal axis of either of the adjacent vehicle segments.

16. The method of claim 13 wherein the step of generating an estimate comprises estimating the length of the second vehicle segment according to:

$$L = R * \tan(\alpha)$$

wherein L is the length of the second vehicle segment length, R is the turning radius of the vehicle and $\alpha$ is the sensed articulation angle.

17. The method of claim 16 wherein the step of controlling comprises modifying orientation of a plurality of vehicle wheels relative to an associated longitudinal axis of at least one of the plurality of pivotally connected segments.

18. The method of claim 16 wherein the step of controlling comprises modifying the orientation of a plurality of wheels associated with a controlled one of the plurality of pivotally connected segments so as to substantially follow the path of a plurality of wheels associated with an adjacent one of the plurality of pivotally connected segments.

19. The method of claim 16 wherein the vehicle includes a braking system and wherein the step of controlling comprises modifying operation of the braking system.

* * * * *